United States Patent

Nerwin

[15] 3,687,037
[45] Aug. 29, 1972

[54] FILM CARTRIDGE AND CAMERA EMPLOYING SAME

[72] Inventor: Hubert Nerwin, 85 Parkwood Ave., Rochester, N.Y. 14650

[22] Filed: April 6, 1970

[21] Appl. No.: 25,956

[52] U.S. Cl. ............................................. 95/31 R
[51] Int. Cl. ........................................... G03b 19/04
[58] Field of Search ................... 95/31, 31 CA, 34 R

[56] References Cited

UNITED STATES PATENTS

| | | | |
|---|---|---|---|
| 3,384,318 | 5/1968 | Nerwin | 95/31 CA UX |
| 3,541,935 | 11/1970 | Steisslinger | 95/31 R X |
| 3,138,081 | 6/1964 | Nerwin | 95/34 X |
| 3,364,551 | 1/1968 | Napor | 95/31 X |
| 3,490,350 | 1/1970 | Hardies | 95/31 CA |

Primary Examiner—Samuel S. Matthews
Assistant Examiner—Monroe H. Hayes
Attorney—Robert W. Hampton and D. Peter Hochberg

[57] ABSTRACT

A film cartridge includes a wall member having a forwardly facing surface along which a strip of film is movable between a film supply compartment and a film take-up compartment. At opposite sides of the portion of the film located in exposure position forwardly of that flat surface, the wall member defines forwardly extending seating projections which are held in resilient contact with fixed rearwardly facing camera surfaces to position the cartridge in predetermined relation to the camera lens system. A set of guide studs are similarly located to maintain the lateral position of the film. The edges of the exposure portion of the film are over-lapped by stationary rearwardly facing camera surfaces spaced forwardly of the flat cartridge surface by the seating projections to maintain the film exposure area in supported cooperation with that cartridge surface without interfering with longitudinal film movement. A set of positioning pads locates the cartridge vertically in the camera, and one of the guide studs serves the further function of determining the horizontal location of the cartridge in the camera.

10 Claims, 8 Drawing Figures

Patented Aug. 29, 1972
3,687,037
3 Sheets-Sheet 1
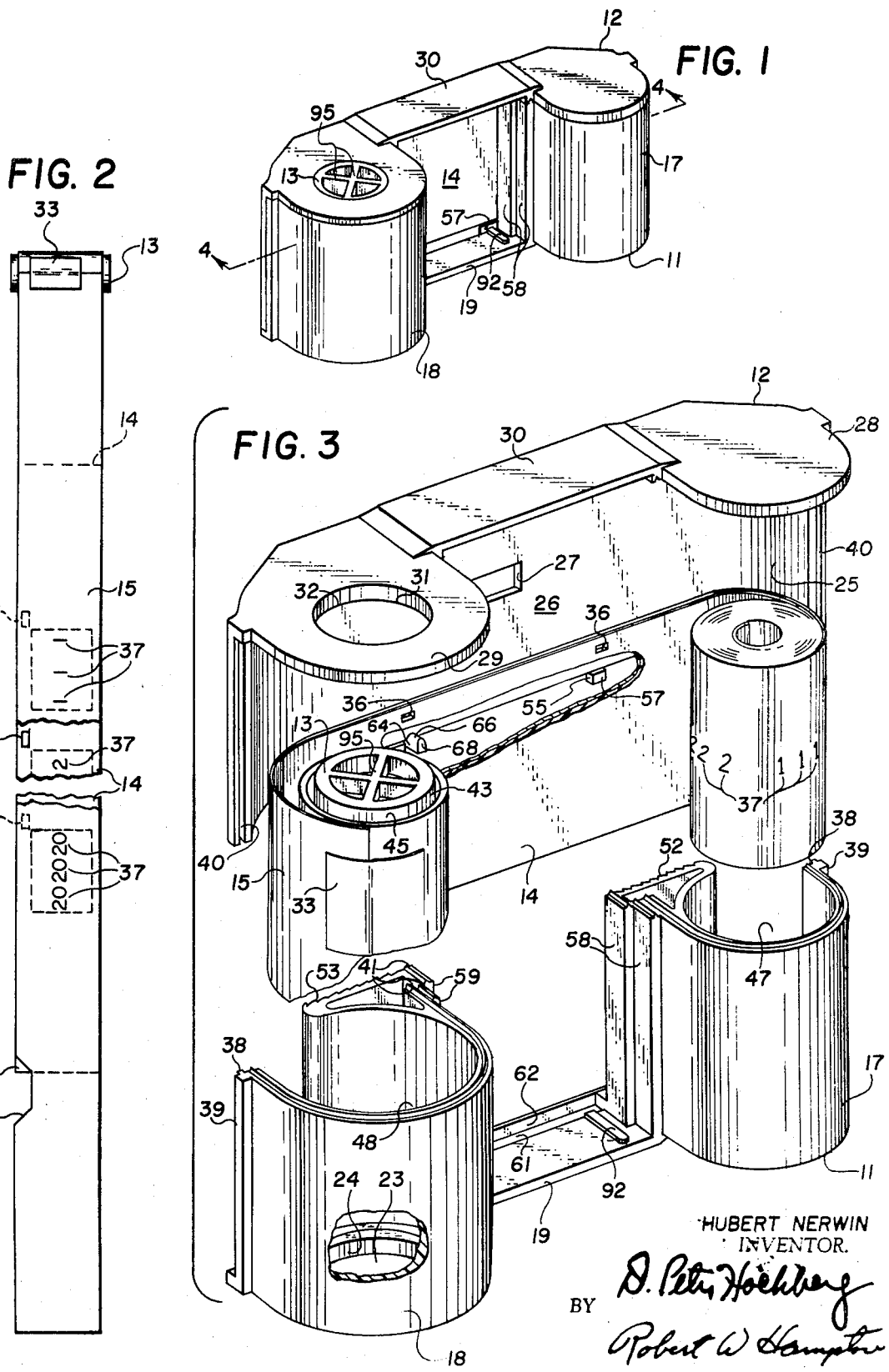
HUBERT NERWIN
INVENTOR.
BY
ATTORNEYS

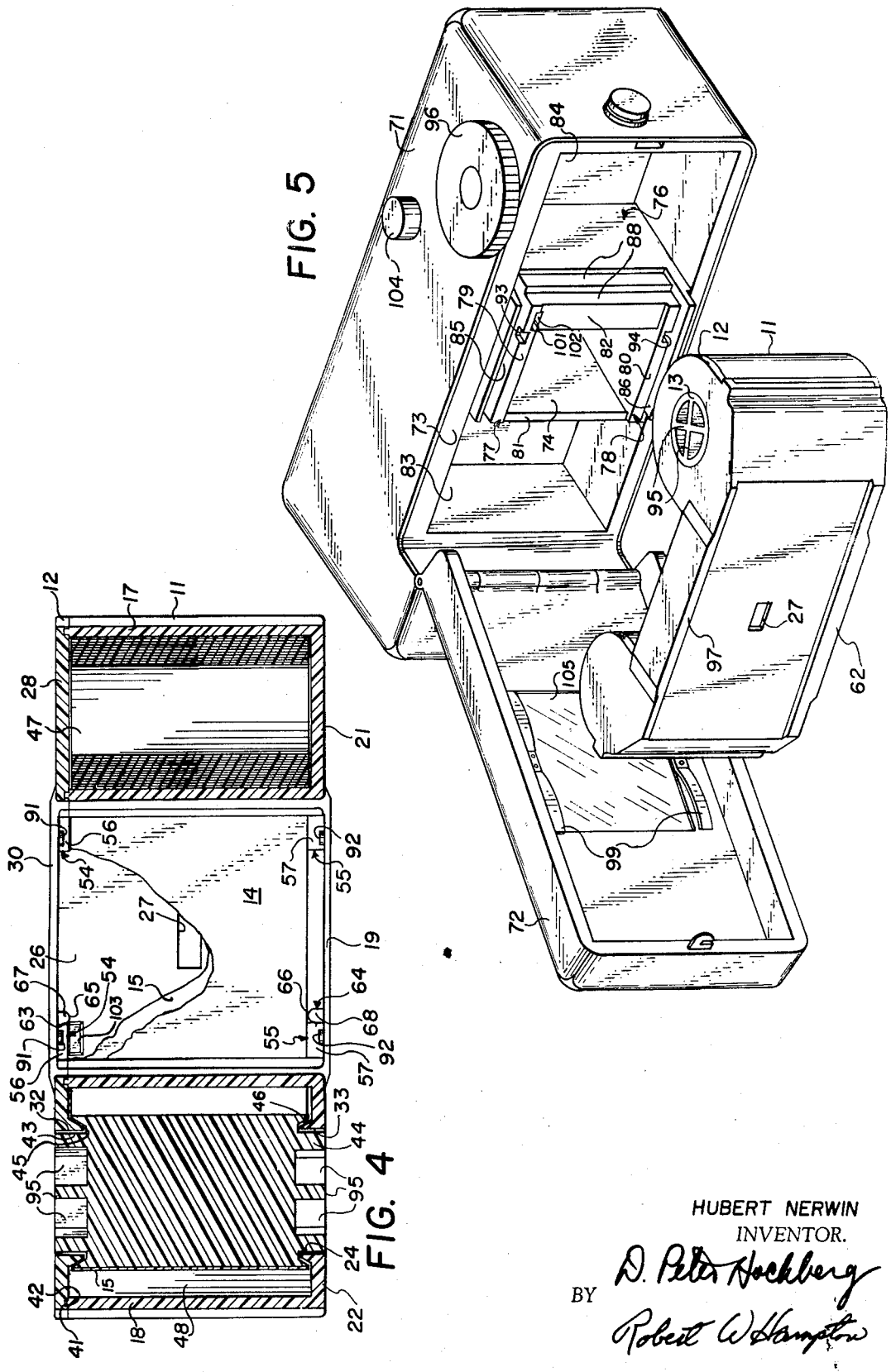

HUBERT NERWIN
INVENTOR.

BY D. Peter Hochberg
Robert W Hampton
ATTORNEYS

FILM CARTRIDGE AND CAMERA EMPLOYING SAME

BACKGROUND OF THE INVENTION

1. Field of the Invention

The present invention relates to magazine loaded cameras and more particularly to means for improving the flatness and accurate positioning of an exposure area of a strip of film loaded into a camera in a double compartment film cartridge.

2. Description of the Prior Art

A film cartridge of the type to which the present invention relates comprises a film supply compartment attached to a film take-up compartment by an intermediate wall member which maintains the two compartments in predetermined spaced relation to one another. Initially, a strip of film is coiled within the film supply compartment with its leading end extending into the take-up compartment. A rotatable winding core is provided within the latter compartment on which the film and paper are subsequently wound. When the magazine is loaded into a camera, the portion of the film strip between the two compartments is supported by a film gate in a focal plane of the camera lens system so that successive exposures can be made along the film strip as it is advanced through the gate and wound into the take-up compartment.

In the currently popular type of film cartridge as disclosed in U.S. Pat. Nos. 3,138,081 and 3,138,084, the film gate comprises a flat forwardly facing surface of the back wall member of the cartridge and one or more coplanar rearwardly facing surfaces of a front gate member joined to the back wall member along its lateral edges. The rearwardly facing surfaces of the front gate members are adapted to engage marginal regions of the front emulsion surface of the film laterally adjacent the film exposure area, thus positioning the film exposure area in a flat plane defined by the flat cartridge surface rearwardly thereof. The entire cartridge, in turn, is positioned in the camera by the cooperation of forwardly facing seating surfaces on the front gate member with corresponding rearwardly facing surfaces within the camera so that the flat exposure area of the film is coincident with a predetermined focal plane of the camera lens system. While this arrangement offers many advantages, including the light and dust tight cooperation thereby afforded between the cartridge and the internal camera structure, one disadvantage thereof is that the accurate flat positioning of the film exposure area in predetermined relation to the lens system depends on the relative location of several surfaces defined by different elements of the cartridge.

In order to reduce the critical tolerance requirement inherent in the above-described construction, commonly assigned copending U.S. Pat. Application Ser. Nos. 667,893, now abandoned and 667,894, now U.S. Pat. No. 3,490,350 both entitled "Film Magazine Locating Means," filed concurrently in the names of Hubert Nerwin, Albert M. Hardies and Harry L. Fanning, on Sept. 15, 1967 disclose means for positioning the cartridge relative to the camera by the direct cooperation between seating surfaces defined by the camera and those defined by the back wall member of the cartridge, rather than by the front gate member. Nevertheless, the spacing of the front gate member from the back wall member must still be controlled within relatively close tolerances during the assembly of the cartridge to establish proper supporting cooperation between the film and the flat cartridge wall surface without interferring with the longitudinal movement of the film.

Alternatively, as disclosed in commonly assigned U.S. Pat. Application Ser. No. 700,056, now U.S. Pat. No. 3,581,641 entitled "Film Cartridge and Camera," filed in the name of Hubert Nerwin on Jan. 24, 1968, it has been proposed to eliminate entirely the necessity for such critical assembly tolerances by resiliently urging the entire cartridge toward a fixed internal member of a camera adapted to engage the marginal regions of the film at opposite sides of the film exposure area. Thus, the marginal regions of the film adjacent the exposure area are sandwiched between the forwardly facing flat cartridge surface and the rearwardly facing camera member to position the exposure area in a focal plane of the camera lens system. In such an arrangement, however, the force with which the cartridge is urged resiliently into contact with the internal camera member must be quite limited if the film is to be freely movable; whereas it otherwise would be preferable to seat the magazine very firmly in contact with the fixed magazine supporting surfaces within the camera.

Also, present film cartridges having forwardly and rearwardly facing gate members are incapable of being adapted to receive film strips having different thicknesses, without substantial alteration of the production molds. Thus, if a film strip having a combined backing paper and film thickness of 0.010 inches were to be replaced by a paperless film strip of substantially lesser thickness, film flatness could not be maintained using the existing cartridge structure.

SUMMARY OF THE INVENTION

An object of the present invention is to simplify the construction of film cartridges and to eliminate the necessity for maintaining close tolerances between different elements thereof, without detracting from the accuracy with which a film exposure area is positioned in predetermined relation to a camera lens system, and without imposing limitations on the resilient force applicable to the cartridge to maintain it in supported engagement with the internal camera structure. Briefly, this object is realized in accordance with the invention by providing forwardly extending seating projections integrally with a back wall member of the cartridge. The back wall member has a flat forwardly facing film gate surface along which film is moved between the two cartridge compartments. These projections are adapted to engage a rearwardly facing member of the camera to position the entire cartridge relative to the camera lens system under the influence of relatively strong resilient means urging the cartridge in a forward direction. The rearwardly facing camera member includes coplanar rearwardly facing front film gate surfaces adapted to overlap the edges of the film adjacent the seating projections to hold the film exposure area in a flat plane established by the forwardly facing back gate surface of the cartridge. Thus, the seating projections determine the position of the entire cartridge relative to the lens system and maintain the opposed gate surfaces at a predetermined spaced distance adapted to provide free longitudinal movement of the film and its protective backing paper, if such is provided. Accordingly, the cartridge can be urged forwardly in the camera by a spring or equivalent means of sufficient strength to maintain the cartridge very firmly in its required position, even to the extent of overcoming slight distortion of the back wall member of the cartridge by forcing the seating projections into positive engagement with the corresponding camera surfaces. Additionally, since the seating projections of the cartridge are formed integrally with the back wall member, which also defines the forwardly facing back film gate surface, the tolerances to which other elements of the cartridge are assembled to the back wall member are entirely irrelevant with regard to establishing accurately the position of the film exposure area relative to the camera lens system.

Another object of the present invention is to provide means for locating a film cartridge vertically and horizontally within a camera. Accordingly, a set of positioning pads integral with the cartridge is provided for engaging cooperating means in the camera to locate the cartridge vertically in the camera. Horizontal location of the cartridge is accomplished by means of a guide stud, which additionally cooperates with another guide stud to fulfill a further object of the invention, namely to maintain the lateral position of film strip in the film gate.

In addition to the novel means provided by the present invention to establish the position of the film exposure area relative to the camera lens system, the illustrative embodiment of the invention also incorporates other improvements adapted to simplify the production of the various cartridge components and the assembly thereof, while at the same time improving the effectiveness of the cartridge in protecting the film from accidental exposure to light, dust, or other damaging influences.

Various means for practicing the invention and other advantages and novel features thereof will be apparent from the following detailed description of the illustrative preferred embodiment illustrated in the accompanying drawings, in which like reference numerals refer to like elements.

BRIEF DESCRIPTION OF THE DRAWINGS

In the accompanying drawings:

FIG. 1 is a perspective front view of an illustrative preferred embodiment of a film cartridge according to the invention;

FIG. 2 is a plan view of the film assembly employed in the cartridge shown in FIG. 1;

FIG. 3 is an enlarged exploded front perspective view of the film cartridge shown in FIG. 1;

FIG. 4 is a front elevational view of the film cartridge shown in FIGS. 1 and 2 shown in cross section along the line 4—4 of FIG. 1 and with a portion of the film and its protective backing paper shown broken away in the film exposure area thereof;

FIG. 5 is a rear perspective view of an open camera according to the invention and of the film cartridge illustrated in the preceding Figures in position for insertion into the camera;

DESCRIPTION OF THE ILLUSTRATIVE PREFERRED EMBODIMENT

Figure 6:
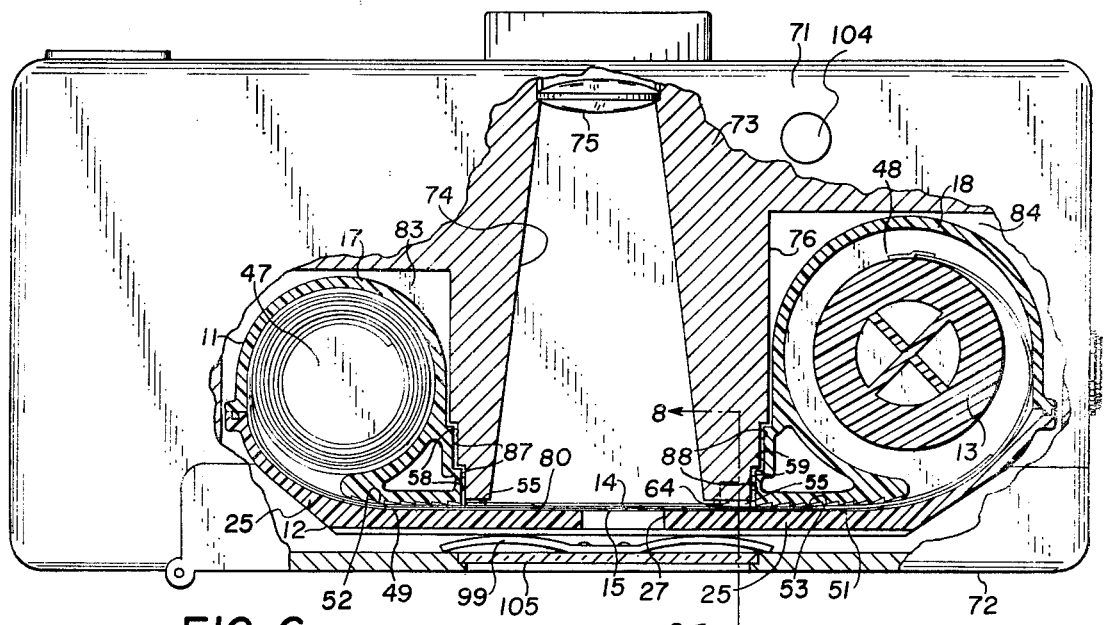
FIG. 6 is a top plan view of the camera shown in FIG. 5 with the film cartridge loaded therein, depicted partially in cross section to illustrate internal details of the camera and film cartridge.
Figure 7:
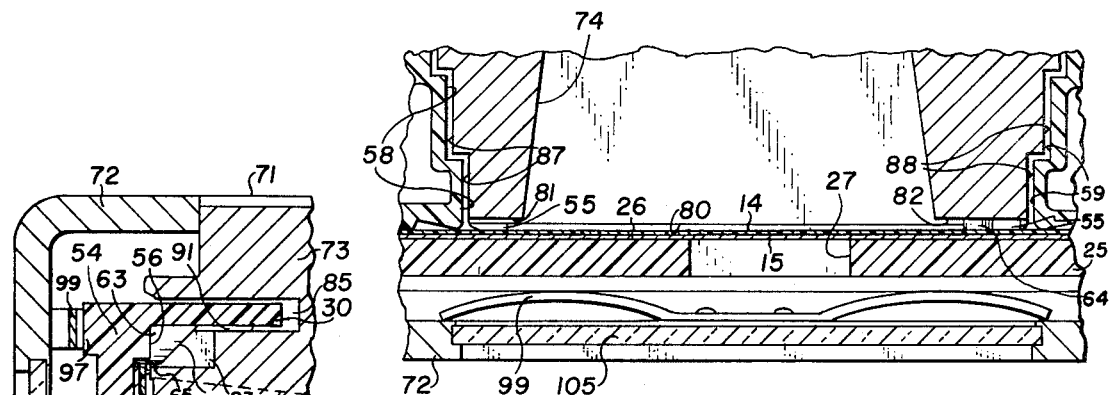
FIG. 7 is an enlarged view of a portion of FIG. 6.

By reference to FIGS. 1–4, it will be seen that the subject film cartridge comprises a lower casing member 11, an upper casing member 12, a film winding core 13, an elongate strip of film 14 and a strip of opaque protective backing paper 15. The lower casing member is formed of molded plastic and includes a film supply compartment member 17 and a film take-up compartment member 18, joined together by a lower wall member 19. As illustrated in FIG. 4, the lower end of the film supply compartment member is entirely closed by end wall 21; whereas a similar end wall 22 at the lower end of the film take-up compartment member is provided with a central opening 23 surrounded by inwardly projecting lip 24. The upper casing member is also formed of molded plastic material and comprises a relatively thick back wall member 25 curved forwardly toward its opposite ends from a flat forwardly facing back film gate surface 26 surrounding a rectangular aperture 27. Cover members 28 and 29, adapted to close the upper ends of the respective film supply and take-up compartment members, extend forwardly from the top edge of the back wall member and are joined by upper wall member 30 corresponding to lower wall member 19. As in the case of the lower compartment end walls, cover member 28 is entirely imperforate whereas cover member 29 is provided with opening 31 surrounded by an inwardly projecting lip 32.

As depicted in FIGS. 2 and 3, the film assembly employed in the subject cartridge comprises the cylindrical molded plastic winding core 13, to which the leading end of the elongate strip of protective backing paper 15 is attached by a piece of pressure sensitive tape 33 or other appropriate means. The leading end of film strip 14 is positioned adjacent the winding core, with the trailing end of the film terminating short of the trailing end of the backing paper adjacent edge notch 35 in the latter. Along its upper edge, the film strip is provided with a series of uniformly spaced metering holes 36 in alignment with edge notch 35 in the backing paper. As later described, these holes serve to control the advancement of the film in a camera by cooperation with a metering pawl incorporated in the camers's film advancing mechanism. Similarly spaced reference numerals 37 are also provided along the back surface of the backing paper and are visible through aperture 27 in the back wall member of the cartridge for exposure identification purposes.

When the cartridge is assembled, tongues 38 along the vertical end ribs 39 of the lower casing member are received in light tight cooperation with vertical mating grooves 40 at the ends of the back wall member of the upper casing member. Additionally, the mutually abutting upper and lower surfaces of the two casing members beyond the upper and lower wall members are provided with similar tongues and grooves as shown respectively at 41 and 42 in FIG. 4. Tongues 41 preferably are of V-shaped configuration as best depicted in FIG. 3, and initially are slightly higher than the depth of the mating grooves. By this means, the apexes of the tongue can be fused into the flat base surfaces of the mating grooves by the application of pressure and ultrasonic energy, thereby joining the two casing members with a permanent light tight seal without the use of glue or solvents.

In the assembled cartridge, winding core 13 is rotatably supported by the reception of its opposite cylindrical end hubs 43 and 44 in the corresponding openings 31 and 23 of the upper and lower casing members. The corresponding opposed inwardly facing lips 32 and 24 surrounding these openings are received in mating arcuate grooves 45 and 46 in the hub member to provide labyrinth light barriers. Accordingly, it will be seen that this construction provides film supply and take-up chambers 47 and 48 which are completely light tight except along the film passageways shown at 49 and 51, in FIG. 6, which are defined between the rearwardly facing wall surfaces 52 and 53 of the lower casing member and the corresponding forwardly curved end surfaces of back wall member 25.

Figure 8:
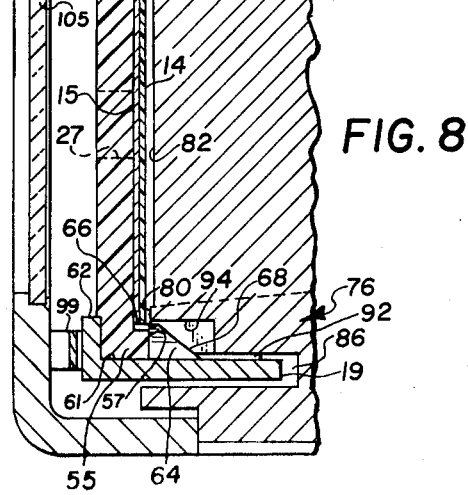
FIG. 8 is an enlarged cross sectional view of the same portion of the camera and cartridge shown in FIG. 6, taken along the line 8—8 of FIG. 4.

Above and below the flat film support surface 26 of the back wall member, pairs of seating projections 54 and 55 extend forwardly from that member by a distance just slightly exceeding the combined thickness of the film and backing paper to provide pairs of coplanar forwardly facing seating surfaces 56 and 57 forwardly of and parallel to the back film gate surface 26. When the upper and lower casing members are assembled, the lower pair of seating projections 55 are received between the lower portions of the rearwardmost opposed parallel surfaces of the confronting stepped walls 58 and 59 of the respective film supply and take-up compartment members. As best illustrated in FIGS. 3 and 8, the lower edge of projection 55 occupies a shallow groove 61 in lower wall member 19 and abuts against an upwardly projecting lip 62 formed integrally within that wall member, thereby establishing a light tight joint.

Initially, most of the film and backing paper are wound within the film supply compartment as shown in FIGS. 3 and 6, with the leading end of the film and the corresponding portion of the paper extending through the film passageways. The opposed wall surfaces defining those passageways are spaced to provide just sufficient clearance to accommodate the film and paper, thus preventing light from entering the film chambers past the film and paper in the passageways. Also, the rearwardly facing wall surfaces 52 and 53 within the passageways may be provided with transverse grooves, as illustrated, to preclude light from entering the film chambers by grazing reflection along the front emulsion surface of the film within the passageways. As disclosed in previously cited U.S. patent application Ser. No. 700,055, the film passageways preferably define a gradually curved film path between the film chambers and the film exposure area surface 26, in order thereby to minimize distortive influences imparted to the film by abrupt curvature transitions. In accordance with the invention disclosed in commonly assigned copending U.S. patent application Ser. No. 25,848, entitled "Film Cartridge and Photographic Apparatus Using Same," filed in the name of Evan Albert Edwards on even date herewith, the film and backing paper are not positively connected to one another. However, as the winding core is rotated, the frictional engagement between the film and paper draws the leading end of the film into the nip between the paper and the winding core so that that end of the film is secured frictionally to the core by the subsequent convoluting of film and paper thereon. It will also be noted that, whereas the two film compartments in most conventional cartridges are of similar sizes, the diameter of the film supply chamber of the present cartridges is approximately the same as that of the winding core in the proportionately larger film take-up chamber. As disclosed more specifically in commonly assigned U.S. patent application Ser. No. 25,864 which issued on Oct. 19, 1971 as U.S. Pat. No. 3,614,012, entitled "Elimination of Backing Paper Shortage in Roll Film Cartridges," filed in the names of Robert I. Edelman and Evan Albert Edwards on even data herewith, this construction allows the cartridge to be loaded with a relatively long strip of paper-backed film without producing film buckling in the film gate as the result of the unequal rate at which film and paper are delivered and absorbed by the respective supply and take-up reels during advancement of the film.

While the lateral position of the portion of the film extending between the film passageways along wall surface 26 could be established between the opposed edges of seating projections 54 and 55, this function is performed by means of a pair of film guiding studs 63 and 64. As best depicted in FIGS. 3, 4 and 8, the opposed curved surfaces 65 and 66 of these studs extend inwardly from the seating projections and engage the edges of the film and backing paper to maintain it in a predetermined lateral position within the film gate. Since the opposed stud surfaces engage the film and backing paper at only two points, this guide structure can tolerate angular misalignment of the film to an extent that might produce jamming if the longer side surfaces of the seating projections were employed to serve the same function. Furthermore, the sloped forward edges 67 and 68 of the respective guide studs 63 and 64 extend forwardly beyond the seating projections and thereby serve to guide the film between the latter projections in the event that the film is bowed away from surface 26 before the cartridge is loaded into a camera. As will be described below, the upper guide stud also serves still another function in establishing the endwise orientation of the magazine relative to the camera in which it is loaded.

The illustrated camera shown in FIGS. 5 through 8 includes an exterior housing comprising a front casing member 71 provided with a hinged rear cover door 72 adapted to close the housing when latched in the closed position illustrated in FIG. 6. An internal body member 73 is housed within the front casing member and includes a tapered rectangular opening 74 extending rearwardly from the lens system of the camera represented by lens 75. The depicted lens is shown in fixed supported relation to the internal body member, but it should be understood that one or more elements of the lens system could be movable along the optical axis of that system to provide for focusing adjustment. Surrounding opening 74, the body member defines an open ended boxlike structure 76 provided with a pair of rearwardly facing support rails 77 and 78, the rearwardly facing front gate surfaces 79 and 80 of which are in coplanar relation to one another coincident with a focal plane at which the camera lens system focuses the image of an object within a given distance range from the camera. Between the two support rails, the boxlike structure is recessed slightly as shown at 81 and 82, as explained in greater detail below.

When the magazine is installed in the camera, its film supply and take-up compartments occupy corresponding receptacles 83 and 84 in the body member. These two receptacles are joined by horizontal channels 85 and 86 in boxlike structure 76, which are adapted to provide light tight accommodation to the upper and lower wall members of the cartridge so that the boxlike structure can be received between those wall members and the two cartridge film compartments to position the cartridge with its seating projections 54 and 55 in contact with support rails 77 and 78. The sides of the boxlike structure include stepped surfaces 87 and 88 adapted to mate freely with the corresponding stepped surfaces 58 and 59 of the cartridge to block light from passing between those confronting surfaces when the cartridge is loaded into the camera. Accordingly, the only avenue by which light can reach the film exposure area rearwardly of opening 74 is through the lens system, which is of course provided with an appropriate shutter, not shown. Therefore, the camera cover door need not be light tight to protect the film from ambient light when the camera is loaded.

To insure proper positioning and flatness of the film exposure area, it is essential that the orientation of the cartridge in transverse relation to the lens axis be established in a manner that cannot interfere with the anterior positioning of the cartridge determined by the mutual contact between the seating projections of the cartridge and the support rails of the camera. For this purpose, the interior side of the upper and lower wall members of the cartridge are provided with opposed pairs of positioning pads 91 and 92 respectively, which are received freely but with relatively close tolerances within channels 85 and 86 respectively in the boxlike camera structure to maintain the cartridge in parallel relation to the support rails. Similarly, guide studs 63 and 64 along one of the upper seating projections 56 is adapted to be received in a mating slot 93 in upper support rail 77; thereby establishing the endwise orientation of the cartridge to maintain the opposed stepped surfaces 87 and 88 of the boxlike structure in spaced confronting relation to the corresponding stepped cartridge surfaces 58 and 59. The lower guide stud 64 is likewise received in a slot 94 in lower support rail 78, but that slot is sufficiently wider than the stud to be out of mating contact therewith. Since these positioning means cooperate only along surfaces parallel to the lens axis, it is therefore impossible for them to interfere with proper contact between the cartridge seating projections and the camera support rails. Additionally, it will be noted that positioning pads 91 and guide stud 63 are defined by the upper cartridge casing member and therefore can be maintained in accurate relation to one another and to the other critical cartridge surfaces also defined by that same member without regard to cartridge assembly tolerances.

The film advancing system of the depicted camera includes a winding key, not shown, which is adapted to engage the internal splines 95 of winding core 13 when the cartridge is loaded into the camera. The winding key, in turn, is manually rotatable by means of knob 96, thus allowing film to be wound onto the winding core. By means similar to those disclosed in commonly assigned U.S. Pat. No. Re. 26,181, the winding key is retracted automatically from receptacle 84 whenever the camera door is opened and returns into engagement with the winding core of a cartridge loaded into the camera in response to the closing of the door.

When the camera cover door is closed and latched in that position, the rearward cartridge surfaces along rib 97 and lip 62, opposite seating projections 54 and 55, are engaged by resilient pressure spring members 99 attached to the cover door. Consequently, the entire cartridge is urged forwardly with sufficient force to insure positive seating contact between the seating projections 54 and 55 of the cartridge and the support rails of the camera. As is most clearly depicted in FIG. 8, the front film gate surfaces 79 and 80 of the support rails are substantially wider than the seating projections and overlap the adjacent edges of the front emulsion surface of the film. Since the spacing established by the seating projections between the front and back film gate surfaces is only slightly larger than the combined thickness of the film and backing paper, it is thus apparent that the front exposure surface of the portion of film aligned with the lens system is accurately positioned at the focal plane coincident with the plane defined by the rearwardly facing front gate surfaces along support rails 77 and 78. It should be appreciated, however, that the film and paper are not sandwiched positively between the opposed film gate surfaces, regardless of the strength of spring members 99, but are free to move longitudinally in response to rotation of the winding core.

By recessing the vertical surfaces 81 and 82 of the boxlike structure, the front film gate surfaces defined by support rails 77 and 78 engage only the edge portions of the film strip beyond the central area of the film comprising the successive film exposure areas. Alternatively, those vertical surfaces could be coplanar with the rearwardly facing surfaces of the support rails to provide frontal support to the film along a rectangular region completely surrounding the corresponding film exposure area. However, it has been found that the illustrated construction provides very satisfactory positioning of the film and is preferable in that it avoids entirely the possibility of the film emulsion being scratched in an exposure area by the boxlike structure as the film is advanced. A further advantage of this structure is that if the thickness of the film strip should be changed, such as by eliminating the backing paper, the only dimension on the cartridge which need be changed to preserve the required film flatness tolerance is the thickness of seating projections 54 and 55.

As also disclosed in the above-identified pending U.S. patent application Ser. No. 25,848, the film advancing system of the illustrated camera is provided with a film metering mechanism operated by a pawl member 101 projecting rearwardly through an opening 102 in upper support rail 77. When the cartridge is loaded into the camera, as previously described, this metering pawl engages the upper edge of the film strip in alignment with metering openings 36 and with a recess 103 in the back wall member of the cartridge, best depicted in FIG. 4. As the film is advanced, the metering pawl enters each successive metering opening in the film to a depth limited by engagement of the tapered rearward edge of the pawl with the edge of each metering opening. Each time the pawl enters a film perforation, the resulting sidewise movement of the pawl by the film operates a blocking mechanism which prevents further advancement of the film until an exposure has been made by depressing shutter operating button 104. As is well known in the photographic art, the metering mechanism includes a double exposure prevention system which precludes a second operation of the shutter until the film has again been advanced. Whenever the film is moved to position the succeeding unexposed film area in alignment with the camera lens system, the concurrent movement of the backing paper brings the corresponding reference numeral 37 into alignment with aperture 27, where it can be viewed through a transparent window 105 in the camera cover door. As seen in FIG. 3, the window can be considerably larger than aperture 27 so that the back surface of the cartridge can be provided with an appropriate label, not shown, which is also visible to the operator to provide information identifying the type of film in the cartridge and its exposure characteristics.

After all of the available exposures have been made, i.e. 20 exposures along the film strip shown in FIG. 2, the further advancement of the film ultimately brings its trailing end past the metering pawl. Consequently, the pawl is able to move rearwardly past the film and through notch 35 in the backing paper into recess 103. This rearward movement of the pawl beyond the plane of the backing paper blocks the winding mechanism until the pawl is again moved forwardly by the installation of a fresh cartridge. Accordingly, the trailing end of the film and the corresponding portion of the backing paper remain in the film passageway of the film take-up compartment to prevent light from entering the take-up compartment via that passageway. Additionally, by thus preventing the film and backing paper from being wound entirely into the take-up chamber, this arrangement enables the film to be removed from the cartridge for processing by being pulled out of the take-up chamber by means of the trailing end of the backing paper which remains accessible between the two cartridge compartments.

The invention has been described in detail with particular reference to a preferred embodiment thereof, but it will be understood that variations and modifications can be effected within the spirit and scope of the invention.

I claim:

1. A photographic cartridge for use in a camera, said cartridge comprising:
    a. a back wall member for defining a forwardly facing web positioning surface having opposite ends;
    b. web compartment members attached to said back wall member to provide a web supply chamber and a web take-up chamber in a fixed relation to said web positioning surface, said compartment members being disposed proximate said respective opposite ends;
    means for defining web passageways leading into said chambers from said web positioning surface;
    d. an elongate web comprised of, at least in part, a strip of photographic film, said web having opposite lateral edges and extending between said web compartment members via said passageways and along said web positioning surface; and
    e. a plurality of rigid seating projections extending forwardly from said back wall member beyond the opposite lateral edges of the portion of said web extending along said film positioning surface, said seating projections respectively defining substantially coplanar forwardly facing seating surfaces which are spaced from said web positioning surface by a distance slightly greater than the thickness of said web, whereby said seating surfaces are operable to engage gate surfaces carried by said camera to space said gate surfaces from said web positioning surface by a distance slightly greater than the thickness of said web, and to thereby position said web with respect to said camera.

2. A photographic cartridge according to claim 1 in which said elongate web includes a protective backing strip which is interposed between said web positioning surface and said strip of film along the portion of said web extending between said passageways.

3. A photographic cartridge according to claim 1 in which said back wall member comprises a one piece molded plastic cartridge component with said seating projections and said web positioning surface formed integrally therewith.

4. A photographic cartridge according to claim 3 wherein a first and second of said seating projections reside along respective opposite sides of the portion of said web extending between said passageways.

5. A photographic cartridge according to claim 3 in which said web compartment members are located forward of said back wall member and are joined by upper and lower wall members extending forwardly from said back wall member beyond said seating projections, but not as far as said web compartment members, whereby said seating projections and said portion of said web are surrounded by rectangularly disposed forwardly facing structures defined by said upper and lower wall members and by the opposed exterior surfaces of said compartment members adjacent said passageways.

6. A photographic cartridge according to claim 5 in which one of said upper and lower wall members is formed integrally with said back wall member and is provided with cartridge positioning pads which define respective cartridge positioning surfaces located in a predetermined plane perpendicular to the plane of said film positioning surface.

7. A molded plastic photographic cartridge for use in a camera, said cartridge comprising:
    a. an integrally molded one piece lower casing member including
        1. a web supply compartment member for defining a generally cylindrical internal web supply chamber open at its upper end and having a central axis, said web supply compartment member comprising a rearwardly facing external curved surface, 2. a web take-up compartment member for defining a generally cylindrical internal web take-up chamber open at its upper end and having a central axis, said web take-up compartment member comprising a rearwardly facing external curved surface, 3. a lower wall member extending between the lower ends of said compartment members to maintain the latter in parallel spaced relation to one another, and lying in a plane normal to the axes of said cylindrical chambers, and 4. means for defining an opening into each of said chambers, said openings being parallel with the axes of said chambers and extending along the rearwardly facing external curved surface of the corresponding compartment member, b. a web winding core supported for rotation within said web take-up chamber, c. an integrally molded one piece upper casing member attached to said lower casing member and including 1. a back wall member having upper and lower portions and defining a forwardly facing surface having a flat central surface region extending between said compartments in a plane parallel with the axes of said chambers, and forwardly curved end surface regions located in confronting spaced relation to the corresponding rearwardly facing curved external surfaces of said compartment members to define curved web passageways at opposite ends of said flat central surface region between said compartment members, leading into said chambers through said vertical openings.

2. compartment cover members extending forwardly from the upper portion of said back wall member to close the upper ends of said chambers and said web passageways, and 3. an upper wall member normal to the central region of said back wall member, extending between said compartment members and projecting forwardly from said back wall member in parallel relationship with the lower wall member similarly joining the lower ends of said compartment members, d. An elongate web comprised of, at least in part, a strip of photographic film, said web having opposite lateral edges and extending between said web compartment members along said passageways and along said flat central region;

e. light barrier means for establishing light tight cooperation between said upper and lower casing members adjacent said web chambers and web passageways and along the juncture between the lower edge of said back wall member and the rearward edge of said lower wall member, and f. a plurality of seating projections formed integrally with said back wall member and projecting forwardly therefrom at the upper and lower portions of said flat central region separated by a distance greater than the width of said web, said seating projections terminating in means for defining coplanar forwardly facing seating surfaces spaced from said flat central surface region by a distance slightly greater than the thickness of said web whereby said seating surfaces are operable to engage gate surfaces carried by said camera to space said gate surfaces from said web positioning surface by a distance slightly greater than the thickness of said web, and to thereby position said web with respect to said camera.

8. A photographic cartridge for use in a camera, said cartridge comprising:

a. generally cylindrical web supply and take-up compartments.

b. an elongate web comprised of, at least in part, a strip of photographic film, said web having opposite lateral edges and extending between said web compartment members, c. a wall so connecting said compartments that their longitudinal axes are in substantially parallel relationship, said wall having a forwardly facing portion over which said web may be transported from said supply compartment to said take-up compartment.

d. a plurality of seating projections extending forwardly from said wall and separated by a distance greater than the width of said web, said seating projections having means for defining coplanar forwardly facing seating surfaces spaced from said forwardly facing portion of said wall by a distance slightly greater than the thickness of said web.

e. a pair of opposed parallel end walls extending away from said connecting wall and being disposed to permit the movement of said web therebetween from said supply compartment to said take-up compartment, said end walls embracing therewithin said seating projections.

f. a plurality of pads extending from said end walls, said pads having planar surfaces parallel with said end walls and engageable by cooperating structure in said camera for positioning said cartridge in the direction normal to said end walls, and g. means for positioning said cartridge in the direction parallel to said end walls.

9. A photographic cartridge as defined in claim 8 wherein said means for positioning said cartridge in the direction parallel to said end walls comprises a projection extending forwardly from said compartment-connecting wall and adjacent one of said end walls, said projection being engageable by cooperating structure in said camera.

10. A photographic cartridge as defined in claim 9, said cartridge further comprising a second projection extending from said compartment-connecting wall and adjacent the other of said end walls, said projections having opposing surfaces separated from each other by a predetermined distance, said opposing surfaces being engageable with the lateral edges of film loaded in the cartridge to maintain the lateral position of the portion of said web extending across said compartment-connecting wall.

* * * * *